Jan. 25, 1966  A. WEINING  3,231,227
ADJUSTABLE TREE SUPPORT
Filed April 30, 1962  2 Sheets-Sheet 1

INVENTOR
ANDREW WEINING
BY
Charles L. Lovercheck
attorney

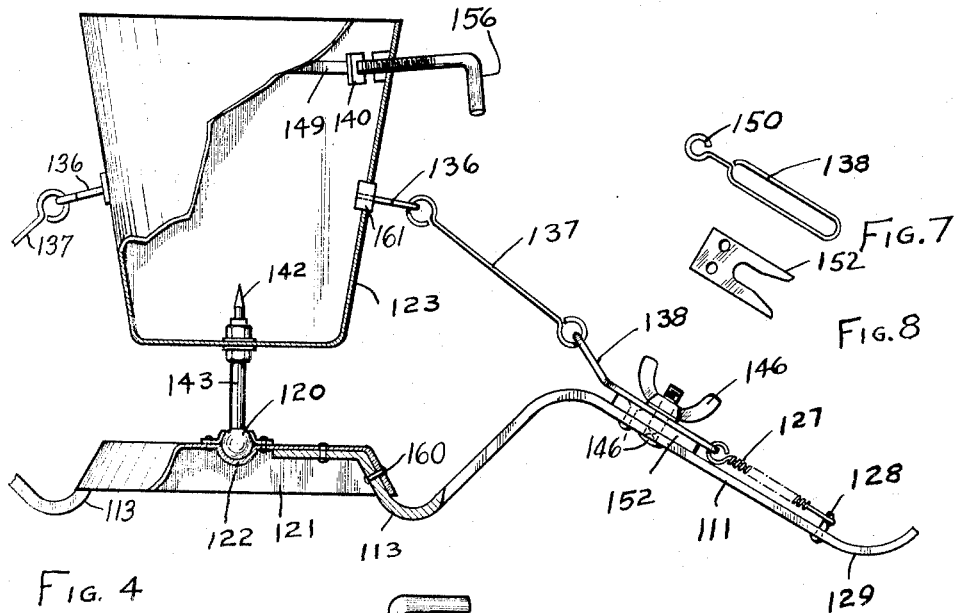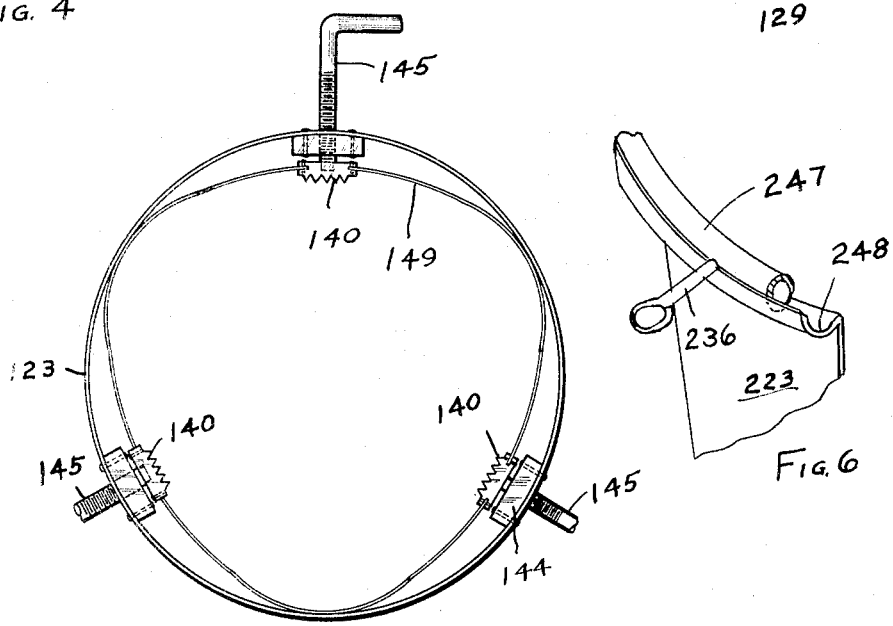

United States Patent Office 3,231,227
Patented Jan. 25, 1966

3,231,227
ADJUSTABLE TREE SUPPORT
Andrew Weining, 1317 Lynn St., Erie, Pa.
Filed Apr. 30, 1962, Ser. No. 190,967
3 Claims. (Cl. 248—47)

This invention relates to tree supports and, more particularly, to adjustable tree supports to make allowance for curvature in tree trunks and to actually hold trees in vertical position.

Various attempts have been made to provide supports of this type and various designs have been provided but none of these have been completely satisfactory.

It is, accordingly, an object of the present invention to provide an improved support for tree trunks.

Another object of the invention is to provide an improved support for tree trunks wherein the tree can be adjusted to correct the curvature of the trunk and, yet, can be held in positive vertical position.

A further object of the invention is to provide a support for tree trunks which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 3 is a top view of a flower pot stand attached to the tree support;

FIG. 4 is a side view partly in central cross section of another embodiment of the invention;

FIG. 5 is a partial top view of the embodiment shown in FIG. 4;

FIG. 6 is a partial view of yet another embodiment of the invention;

FIG. 7 is a top view of one of the parts of the embodiment shown in FIG. 4;

FIG. 8 is a view of yet another part of the embodiment shown in FIG. 4; and

Figure 1:
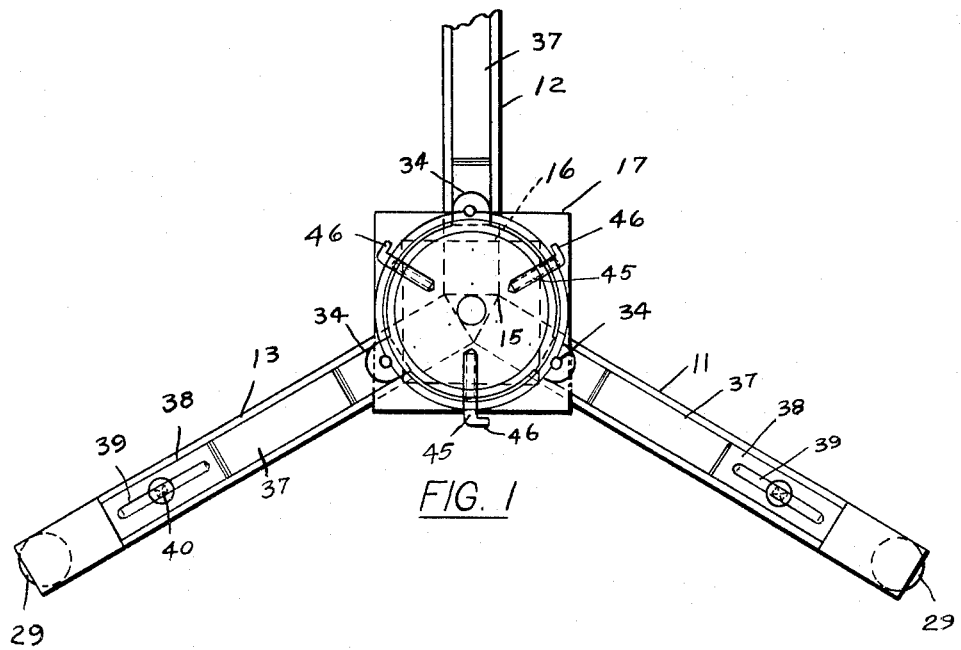
FIG. 1 is a top view of a tree support according to the invention.
Figure 2:
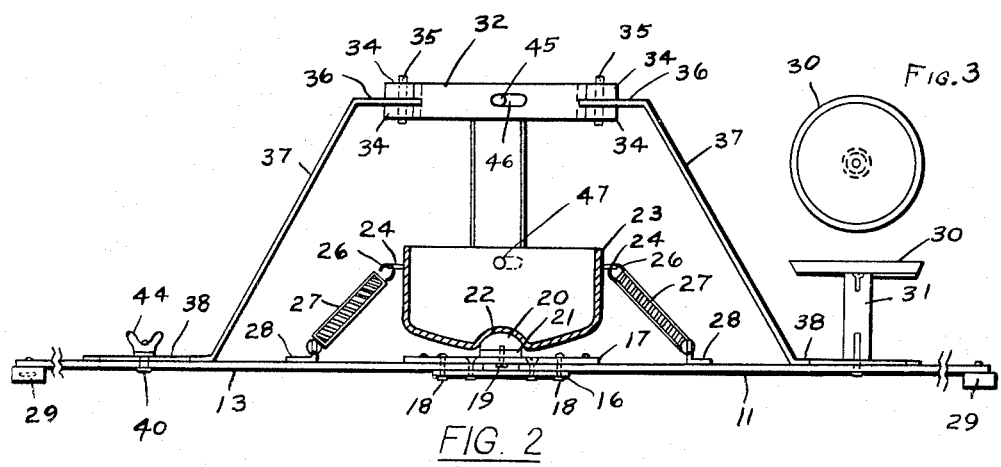
FIG. 2 is a side view of the support shown in FIG. 1.

Now with more particular reference to the drawings, a tree support is shown having a base made up of three legs 11, 12, and 13, all disposed in a common plane, in the embodiment of the invention shown in FIGS. 1, 2, and 3. These legs are preferably made of flat bar stock rectangular in cross section but may be made of any other suitable shape and could be made of metal, plastic, or other suitable material.

The legs 11, 12, and 13 have their inner ends disposed adjacent each other with the corners thereof engaging each other at 15. The inner ends of the legs are sandwiched between an outer plate 16 and an inner plate 17. Suitable rivets, bolts, or the like indicated at 18 extend through the plates 16 and 17 and through the legs 11, 12 and 13 to clamp them all in rigid unitary assembly.

The inner plate 17 may be square; the outer plate 16 can be of smaller size than the inner plate and also square. The outer plate 16 could have a central hole therein to provide access to the head of a screw 19. The screw 19 extends through a hole in the center of the plate 17 and engages a threaded hole in a convex member 20 which is supported above a washer 21. The convex member is received in a cavity 22 in the bottom of a container 23.

The container 23 has ears 24 extending outwardly from the sides thereof and these ears receive upper eyes 26 of springs 27. The lower ends of the springs are attached to brackets 28. These brackets are, in turn, fixed to the legs 11, 12, and 13 by spot welding or other suitable means. The outer ends of these legs have a floor engaging pad 29 attached thereto. The floor engaging pad may be made of a suitable soft material which will not injure a supporting surface such as a varnished floor or the like.

A flower pot stand 30 may be circular or disk like in cross section and supported on a bracket 31 which is attached to the leg 11 at its lower end.

A ring 32 is supported above the container 23 and is adapted to receive the trunk of a tree which may extend downwardly into the container 23. The ring 32 may be made from flat material best in the shape of a circle.

The ring 32 has vertically spaced ears 34 fixed at circumferentially spaced positions thereon and these ears have holes therein to receive pins 35. Upper ends 36 of Z-shaped legs 37 are loosely received between the ears 34. The pins 35 extend through holes in the upper end 36 of each of the legs 37. The legs 37 are made of relatively thin flat material.

The intermediate parts of the Z-shaped legs 37 extend upwardly and inwardly as shown at an angle of approximately sixty degrees to a horizontal. Lower ends 38 of the legs 37 lie along the top of the legs 11, 12, and 13. The ends 38 have slots 39 therein and these slots receive bolts 40 which have heads which underlie the lower sides of the legs 11, 12, and 13 and the threaded upper ends thereof have thumbscrews 44.

By loosening the thumbscrews 44 and sliding the ends 38 along the legs 11, 12, and 13, the horizontal position of the ring 32 can be adjusted relative to the container 23. Therefore, a crooked tree trunk can be supported to hold the top of the tree generally vertical. Threaded screws 45 are radially disposed in threaded holes in the ring 32 and these screws have outwardly turned ends 46 which may be used as handles to tighten the screws against the tree trunk to be supported. Therefore, some lateral adjustment of the tree trunk can be accomplished by means of the screws 45 themselves.

In operation, a tree trunk will be lowered through the ring 32 and the base thereof will rest in the container 23. The container may have suitable spaced screws 47 similar to the screws 45 and these screws may be tightened on the lower end of the trunk while the screws 45 may be tightened on the intermediate part of the trunk and whatever adjustment possible can be made by means of the screws 45 and 47. Then the thumbscrews 44 may be loosened and the ends 38 shifted laterally along the legs 11, 12, and 13 to make the final correction of straightening of the tree trunk. Then the thumbscrews 44 will be tightened and water put in the container 23 and the tree will, therefore, be completely supported.

In the embodiment of the invention shown in FIGS. 4, 5, 7, and 8, a tree support is shown partially with one leg 111 attached to a central member 121 by means of rivets 160 as shown. In practice, three or four of these legs would be attached in a similar manner. These legs have a floor engaging pad section 129 formed by the outer ends of the legs turning up, then a straight portion having wing nut bolts 146 extending therethrough, then extending downwardly and inwardly at 113, then back upwardly, and then horizontally and attached to the central member 121.

A water container 123 is cup shaped and the sides thereof diverge outwardly in a gentle slope as shown. The bottom of the container has a pin 143 extending therethrough which is held to the bottom with a double nut as shown. The pin 143 has a point 142 which can engage the bottom of a tree trunk. The pin 143 has a ball 120 on the lower end thereof fixed thereto and this ball is received in a concave portion 122 in the top of the central member 121.

Scews 145 extend through members 144 and have tree engaging pads 140 attached thereto and these tree engaging pads have teeth on the inside ends thereof which can engage the trunk of a tree. The inner ends of the screws 145 engage the tree engaging pads 140 when the screws are moved inwardly.

A spring 149 is preferably made of flat metallic material and is in the form of a loop or distorted circle having some portions thereof engaging the inside of the container 123 and the ends of the segments of the loop fixed to the pads 140. By tightening the screws 145 by means of handles 156, the springs 149 are distorted inwardly and they engage the tree trunk and prevent it from swinging laterally.

The container 123 providing a tree trunk support is held vertically by means of links 137 which have an inner eye which is received in the eye of an eye bolt 136. The spaced eye bolts 136 which will be three or four in number are held to the container 123 by means of lugs 161 as shown fixed to the sides of the container. The outer ends of the links 137 are received in eyes 150 of loops 138. The outer ends of the loops 138 receive a screw 146 which slides on a pad 152 and has a thumb nut 146'. The outer end of the loop 138 has a spring 127 connected thereto and this tension spring 127 has an outer end fixed to a pin 128.

In the embodiment of the invention shown in FIG. 6, a container 223 is shown which will, in all respects, be similar to that shown in FIG. 4 except that instead of the eye bolts 136 being fixed directly to the container, eye bolts 236 in FIG. 6 will be fixed to a collar 247. The collar 247 will be supported in a rim 248 in the upper peripheral edge of the container 223.

In all other respects, the device in FIG. 6 will be similar to that shown in FIG. 4.

Figure 9:
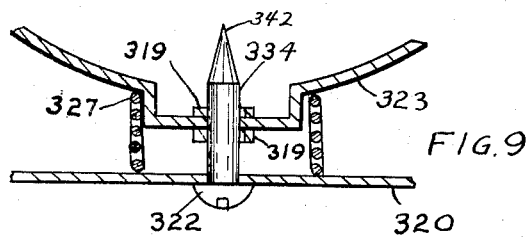
FIG. 9 is a cross sectional view of another embodiment of the invention.

In the embodiment of the invention shown in FIG. 9, a tree holder is shown having a base 320 which will be provided with suitable feet (not shown) for supporting it on a floor. A container 323 will be similar to the container 23 in FIG. 2. A point 342 will be made in the form of a screw or a rivet having a head 322 extending through an opening in the base 320 and having lock members 319 fixing it to the bottom of the container 323. A compression spring 327 will urge the container 323 away from the base 320. The compression spring 327 will be made strong enough to support the weight of the tree.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A tree support comprising a base terminating at the outer portion by floor engaging pads, a device for receiving the trunk of a tree and holding it rigidly therein, said device for holding the trunk of a tree resting on said base, means to adjust the angularity of said tree trunk relative to said base, said means comprising spaced legs attached to the side of said tree trunk receiving device at one end and having their outer ends attached to said base, and springs for urging said base to a predetermined position when said legs are unlocked.

2. A tree support comprising a central member, legs attached to said central member and extending radially therefrom and terminating in floor engaging members, a tree trunk support, said tree trunk support having a ball member attached to the bottom thereof, a socket on said central member receiving said ball member, links attached at one end to said tree trunk support and the outer end thereof attached to said legs by adjustable means, said tree trunk support comprising a support adapted to contain water, a point in the bottom of said support adapted to contain water, threaded screw members in the side of said trunk support, said links being attached to said legs by means of loops, said loops having screws extending therethrough and through said legs, thumb nuts on said screws, and a spring attached to the outer ends of said loops at one end and to said legs at the other, urging said loops toward the outer ends of said legs when said thumb screws are loosened.

3. The support recited in claim 2 wherein said links are attached to said support adapted to contain water by means of a groove on the upper circumferential portion of said support, and an annular member is received in said groove.

References Cited by the Examiner
UNITED STATES PATENTS

| | | | |
|---|---|---|---|
| 1,116,961 | 11/1914 | Weixler | 248—44 |
| 1,421,340 | 6/1922 | Zelazo | 248—44 |
| 1,584,011 | 5/1926 | Clifton | 248—44 |
| 1,644,807 | 10/1927 | Zeigler | 248—47 |
| 2,518,421 | 8/1950 | Freel | 248—47 |
| 2,695,149 | 11/1954 | Chabot | 248—43 |
| 2,821,353 | 1/1958 | Hasenohrl | 248—44 |
| 2,853,261 | 9/1958 | Loeb | 248—38 |
| 2,893,668 | 7/1959 | Applegate | 248—44 |
| 2,913,202 | 11/1959 | Meldrum | 248—44 |
| 2,931,604 | 4/1960 | Weddle | 248—44 |
| 2,933,274 | 4/1960 | Mouslof | 248—44 |

CLAUDE A. LE ROY, *Primary Examiner.*

FRANK L. ABBOTT, *Examiner.*